(12) United States Patent
Suzuki et al.

(10) Patent No.: US 9,145,058 B2
(45) Date of Patent: Sep. 29, 2015

(54) ELECTRIC VEHICLE

(71) Applicant: HONDA MOTOR CO., LTD., Tokyo (JP)

(72) Inventors: Yuuichi Suzuki, Utsunomiya (JP); Ryoji Tomokage, Utsunomiya (JP); Tomoyuki Suzuki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/359,163

(22) PCT Filed: Oct. 31, 2012

(86) PCT No.: PCT/JP2012/078217
§ 371 (c)(1),
(2) Date: May 19, 2014

(87) PCT Pub. No.: WO2013/080736
PCT Pub. Date: Jun. 6, 2013

(65) Prior Publication Data
US 2014/0339009 A1 Nov. 20, 2014

(30) Foreign Application Priority Data
Nov. 30, 2011 (JP) ................................. 2011-261229

(51) Int. Cl.
*B60K 1/00* (2006.01)
*B60L 3/00* (2006.01)
(Continued)

(52) U.S. Cl.
CPC ...... *B60L 3/00* (2013.01); *B60K 1/00* (2013.01); *B60K 11/04* (2013.01); *B60L 3/0007* (2013.01);
(Continued)

(58) Field of Classification Search
CPC .... B60K 1/04; B60K 2001/0438; B60K 1/00; Y02T 90/34; B60L 3/0007
USPC .......................... 180/60, 65.1, 65.31; 307/10.1
See application file for complete search history.

(56) References Cited

U.S. PATENT DOCUMENTS

| 7,538,448 B2 * | 5/2009 | Yoshida et al. ............... 307/9.1 |
| 2005/0012317 A1 * | 1/2005 | Taya et al. ..................... 280/784 |

(Continued)

FOREIGN PATENT DOCUMENTS

| JP | 06-303704 A | 10/1994 |
| JP | 2001-145212 A | 5/2001 |

(Continued)

OTHER PUBLICATIONS

International Search Report, dated Jan. 15, 2013, issued in corresponding application No. PCT/JP2012/078217.
(Continued)

*Primary Examiner* — James English
(74) *Attorney, Agent, or Firm* — Westerman, Hattori, Daniels & Adrian, LLP

(57) ABSTRACT

The electric motor control unit of this electric vehicle is disposed at a first primary surface and/or a facing second primary surface of a plate-shaped member disposed along the anterior-posterior direction of the electric vehicle and having a higher rigidity than peripheral components or vehicle-configuring elements. An electricity storage device is connected to the electric motor control unit by means of wiring and is disposed on the vehicle cabin side of the plate-shaped member in the anterior-posterior direction. Furthermore, the electric motor control unit is provided with a low-voltage circuit unit and a high-voltage circuit unit. The high-voltage circuit unit is disposed on the vehicle cabin side in the anterior-posterior direction with respect to the low-voltage circuit unit.

13 Claims, 7 Drawing Sheets

(51) Int. Cl.
*B60K 11/04* (2006.01)
*B60K 1/04* (2006.01)

(52) U.S. Cl.
CPC ......... *B60L 3/0084* (2013.01); *B60K 2001/001* (2013.01); *B60K 2001/003* (2013.01); *B60K 2001/0438* (2013.01); *B60Y 2400/61* (2013.01)

(56) References Cited

U.S. PATENT DOCUMENTS

| | | | |
|---|---|---|---|
| 2007/0012492 A1* | 1/2007 | Deng et al. | 180/65.1 |
| 2007/0151784 A1* | 7/2007 | Watanabe et al. | 180/68.4 |
| 2007/0222413 A1* | 9/2007 | Kinoshita et al. | 320/104 |
| 2010/0283337 A1 | 11/2010 | Omiya et al. | |
| 2011/0087393 A1* | 4/2011 | Verbrugge et al. | 701/22 |
| 2011/0155485 A1* | 6/2011 | Tsurumi et al. | 180/65.1 |
| 2011/0309790 A1* | 12/2011 | Sasaki | 320/108 |
| 2012/0318586 A1* | 12/2012 | Atarashi | 180/2.1 |
| 2013/0220718 A1* | 8/2013 | Gotou et al. | 180/65.6 |
| 2013/0241486 A1* | 9/2013 | Tomokage et al. | 320/109 |
| 2014/0333130 A1* | 11/2014 | Matano et al. | 307/10.7 |

FOREIGN PATENT DOCUMENTS

| | | |
|---|---|---|
| JP | 2003-047163 A | 2/2003 |
| JP | 2003-156152 A | 5/2003 |
| JP | 2007-099239 A | 4/2007 |
| JP | 4253684 B1 | 4/2009 |
| JP | 2009-148051 A | 7/2009 |
| JP | 2009-190438 A | 8/2009 |

OTHER PUBLICATIONS

Written Opinion, dated Jan. 15, 2013, issued in corresponding application No. PCT/JP2012/078217.

Japanese Office Action dated Nov. 4, 2014, issued in corresponding Japanese National Phase Application No. 2013-547074; W/English Translation. (5 pages).

* cited by examiner

10A

ELECTRIC VEHICLE

TECHNICAL FIELD

The present invention relates to an electric vehicle having an electric motor controller configured to control an electric motor that propels a vehicle. More particularly, the present invention relates to an electric vehicle which is capable of protecting the electric motor controller when impact force is applied to the electric vehicle from the front or rear end thereof.

BACKGROUND ART

There has been proposed a technology for protecting an electric motor controller on an electric vehicle at the time of vehicle collision {U.S. Patent Application Publication No. 2010/0283337 (hereinafter referred to as "US 2010/0283337 A1")}. According to US 2010/0283337 A1, an objection thereof is to provide a vehicle drive apparatus which appropriately protects a power control unit against an external impact thereon (see Abstract and paragraph [0008]).

In order to achieve the above object, the vehicle drive apparatus, denoted by 20, according to US 2010/0283337 A1 includes motor generators MG1, MG2 for generating driving forces and a power control unit (PCU) 21 integrally combined with the motor generators MG1, MG2 for controlling the motor generators MG1, MG2 (see paragraph [0027]). The PCU 21 includes a low-voltage circuit section 71 to which a relatively low voltage is applied, a high-voltage circuit section 75 disposed at a rear side of the vehicle relative to the low-voltage circuit section 71 and to which a relatively high voltage is applied, and a cooling plate 72 for cooling the high-voltage circuit section 75, the cooling plate 72 being disposed between the low-voltage circuit section 71 and the high-voltage circuit section 75 in the longitudinal direction of the vehicle (see Abstract, paragraphs [0055], [0057] through [0059], and FIG. 4).

According to US 2010/0283337 A1, when the vehicle drive apparatus 20 is subjected to an impact from the front end of the vehicle, the low-voltage circuit section 71 absorbs the impact, and the cooling plate 72 that serves to increase the mechanical strength of the front side of the high-voltage circuit section 75 buffers the impact which reaches the high-voltage circuit section 75 to which a high voltage is applied, thereby protecting the PCU 21 from the impact appropriately (see paragraphs [0010] and [0064]). On the rear side of the high-voltage circuit section 75, a water jacket 74, a portion of an MG2/inverter case 64 (a right wall of the water jacket 74 in FIG. 4), and the motor generator MG2 are disposed (see FIGS. 4 through 6).

SUMMARY OF INVENTION

According to US 2010/0283337 A1, as described above, the low-voltage circuit section 71 and the cooling plate 72 are used to protect the high-voltage circuit section 75. However, the invention of US 2010/0283337 A1 is based on the idea of protecting the high-voltage circuit section 75 with the low-voltage circuit section 71, and thus the low-voltage circuit section 71 is not protected.

According to US 2010/0283337 A1, furthermore, the high-voltage circuit section 75 is sandwiched between the cooling plate 72 and the water jacket 74, the portion of the MG2/inverter case 64 and the motor generator MG2 in the longitudinal directions of the vehicle. Consequently, when the vehicle drive apparatus 20 is subjected to an impact from the front end of the vehicle, the high-voltage circuit section 75 may possibly be stuck between and damaged by these components, i.e., the cooling plate 72, the water jacket 74, the portion of the MG2/inverter case 64, and the motor generator MG2.

According to US 2010/0283337 A1, moreover, the high-voltage circuit section 75 is disposed on a rear cooling surface of the cooling plate 72, but not on a front cooling surface thereof. Therefore, the cooling plate 72 tends to be large in size.

The present invention has been made in view of the above problems. It is an object of the present invention to provide an electric vehicle which offers improved protection to an electric motor controller in the event of an impact along the longitudinal directions of the vehicle.

According to the present invention, there is provided an electric vehicle including an electric motor configured to propel the vehicle, an electric storage device configured to supply electric power to the electric motor, an electric motor controller configured to control the electric motor by use of the electric power supplied from the electric storage device to the electric motor, and a peripheral component or a vehicle component of the vehicle which is disposed around the electric motor controller, wherein the electric motor controller is disposed on at least one of a first principal surface and a second principal surface, which is opposite to the first principal surface, of a plate-like member disposed along a longitudinal direction of the vehicle, the plate-like member being more rigid than the peripheral component or the vehicle component, and the electric storage device is disposed more closely to a passenger compartment of the vehicle than the plate-like member in the longitudinal direction of the vehicle, and connected to the electric motor controller by electric wires.

According to the present invention, the plat-like member is more rigid than the peripheral component or the vehicle component and lies along longitudinal directions of the vehicle. When an impact force is applied to the electric vehicle toward the passenger compartment along the longitudinal direction of the vehicle so that the peripheral component or the vehicle component presses the plate-like member, the plate-like member is prevented from being crushed in the longitudinal directions of the vehicle. Therefore, the electric motor controller that is disposed on at least one of the first and second principal surfaces of the plate-like member can be prevented from being damaged. If the electric motor controller is disposed on both the first and second principal surfaces of the plate-like member, then the electric motor controller is prevented from being damaged on both of the first and second principal surfaces.

According to the present invention, furthermore, the electric motor controller is disposed on at least one of the first and second principal surfaces of the plate-like member. Therefore, when the plate-like member is pressed by the peripheral component or the vehicle component upon collision of the vehicle and is displaced so as to slide in the longitudinal direction of the vehicle, the electric motor controller can be prevented from being pressed between the plate-like member and the peripheral component or vehicle component.

According to the present invention, moreover, if the electric motor controller is disposed on both the first and second principal surfaces of the plate-like member, then the plate-like member can be prevented from being increased in size compared to a case where the electric motor controller is disposed on one of the first and second principal surfaces.

According to the present invention, in addition, the electric storage device is disclosed more closely to the passenger compartment of the vehicle than the plate-like member in the longitudinal direction of the vehicle, and connected to the electric motor controller by electric wires. Consequently, when the peripheral component or the vehicle component presses the plate-like member toward the passenger compartment upon collision of the vehicle, the electric wires are displaced toward the electric storage device, or stated otherwise, in a direction in which the electric wires shrink. Therefore, the electric wires that interconnect the electric storage device and the electric motor controller can be prevented from being stretched and damaged.

The electric motor controller may include a low-voltage circuit section to which a relatively low prescribed voltage is applied and a high-voltage circuit section to which a voltage higher than the voltage applied to the low-voltage circuit section is applied. The high-voltage circuit section may be disposed more closely to the passenger compartment than the low-voltage circuit section in the longitudinal direction of the vehicle. Consequently, when the peripheral component or the vehicle component presses the plate-like member toward the passenger compartment upon collision of the vehicle, the low-voltage circuit section undergoes the impact earlier than the high-voltage circuit section. Therefore, the high-voltage circuit section can be further effectively prevented from being damaged.

In the above arrangement, the high-voltage circuit section is disposed more closely to the passenger compartment than the low-voltage circuit section in the longitudinal direction of the vehicle. Therefore, the high-voltage circuit section and the low-voltage circuit section can be positioned in different areas separated in the longitudinal direction of the vehicle on the first or second principal surface of the plate-like member. Therefore, even if the high-voltage circuit section and the low-voltage circuit section are disposed on one principal surface of the plate-like member, the high-voltage circuit section can be prevented from being positioned relatively closely to the low-voltage circuit section. As a result, noise that the low-voltage circuit section receives from the high-voltage circuit section is reduced, and hence the low-voltage circuit section can be prevented from malfunctioning in the electric motor controller.

The high-voltage circuit section may have high-voltage terminals disposed on the first principal surface or the second principal surface of the plate-like member most closely to the passenger compartment, and the electric wires may be connected to the electric storage device and the high-voltage terminals of the high-voltage circuit section. Consequently, when the peripheral component or the vehicle component presses the plate-like member toward the passenger compartment upon collision of the vehicle, the other components than the high-voltage terminals and the electric wires undergo the impact earlier than the high-voltage terminals and the electric wires. Therefore, the high-voltage terminals and the electric wires can be further effectively prevented from being damaged. In addition, as the length of the electric wires that interconnect the electric storage device and the electric motor controller can be relatively shortened, power loss caused by the electric wires can be reduced.

The high-voltage circuit section may include an inverter configured to convert a DC voltage from the electric storage device into an AC voltage and at least one of a first converter configured to step up or down the DC voltage from the electric storage device and a second converter configured to convert an AC voltage from an external power supply into a DC voltage. The inverter may be disposed on one of the first principal surface and the second principal surface of the plate-like member, and the at least one of the first converter and the second converter may be disposed on the other of the first principal surface and the second principal surface. Therefore, the inverter and the first converter or the second converter, each in the form of a high-voltage circuit, can be positioned on mutually different surfaces of the plate-like member. The plate-like member is thus prevented from increasing in size while it effectively cools the inverter and the first converter or the second converter, which each are a heat generator.

If the electric wires are connected to the electric storage device and the high-voltage terminals of the high-voltage circuit section, then the high-voltage circuit section may include high-voltage bus bars interconnecting the high-voltage terminals, and the inverter, the first converter, or the second converter.

The low-voltage circuit section may have a communication line configured to supply a signal for operating the inverter, the first converter, or the second converter. The high-voltage circuit section may include a current sensor connected to a supply line configured to supply the AC voltage from the inverter to the electric motor, and the low-voltage circuit section may include a communication line configured to control the current sensor. The high-voltage circuit section may include contactors connected between charging connectors and the electric storage device, and the low-voltage circuit section may include communication lines configured to control the contactors.

The plate-like member may include, for example, a cooling plate having coolant channels configured to pass a coolant therethrough.

The peripheral component may include a radiator for the coolant or a radiator supporting frame supporting the radiator. The vehicle component may include a front bumper member or a rear bumper member, for example.

DESCRIPTION OF EMBODIMENTS

A. Embodiment

1. Description of Overall Arrangement

[1-1. Overall Arrangement]

Figure 1:
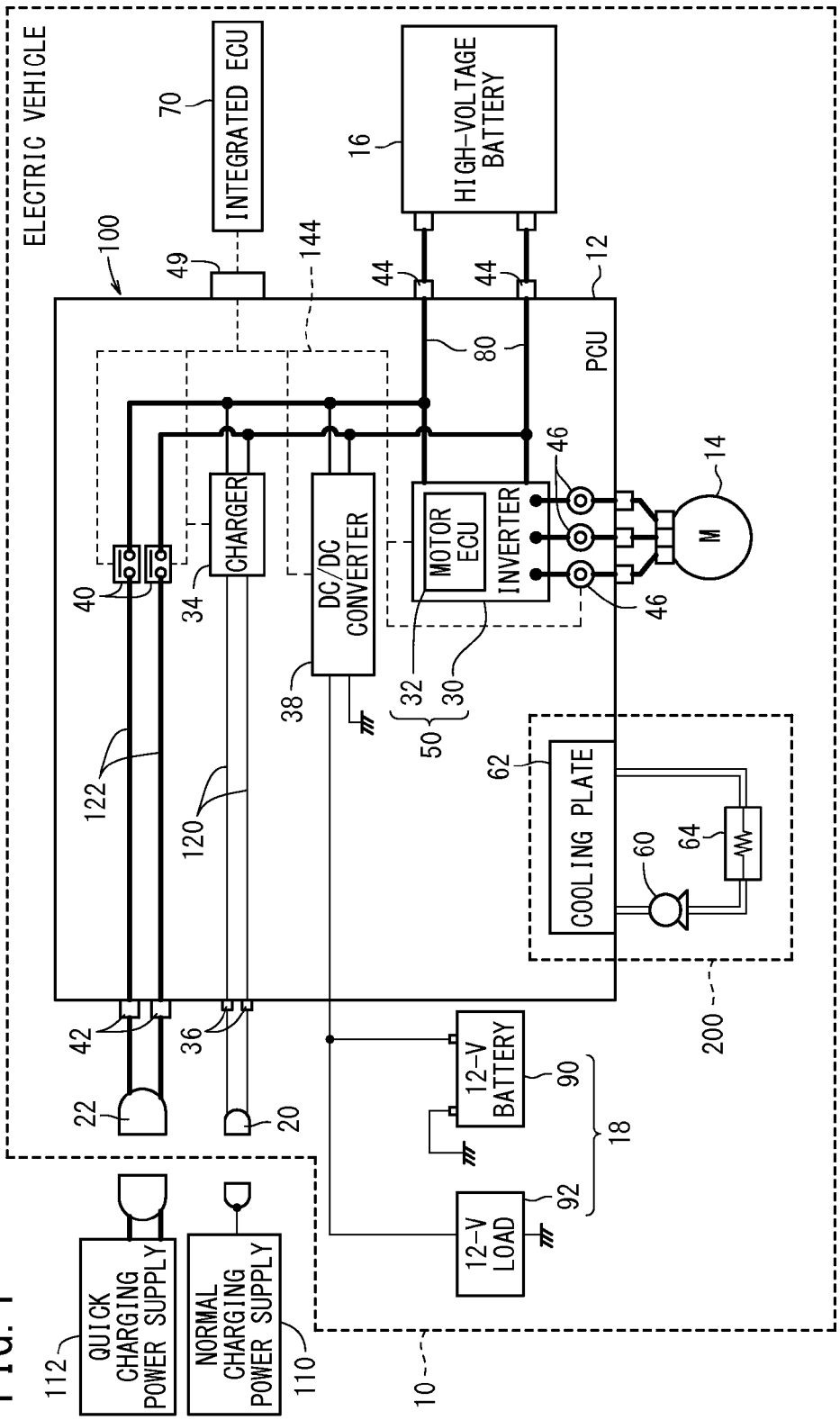
FIG. 1 is an overall schematic block diagram of an electric power system, a cooling system, and their related components of an electric vehicle according to an embodiment of the present invention.
Figure 2:
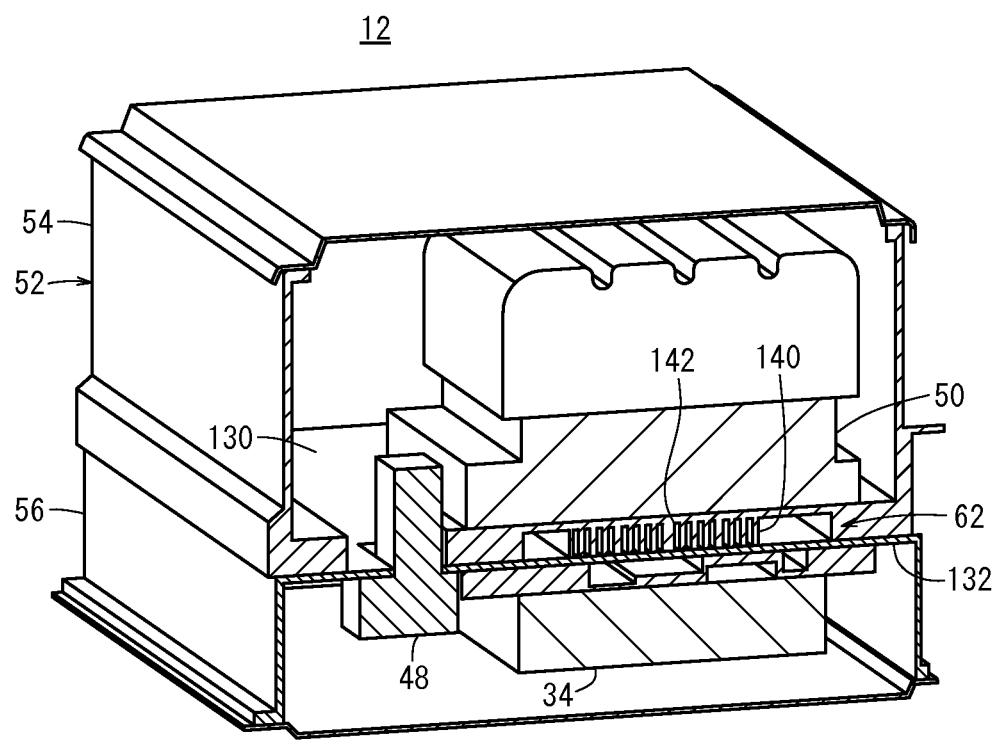
FIG. 2 is a sectional perspective view showing partial structural details and positional relationship of a power control unit (hereinafter referred to as "PCU") on the electric vehicle.

FIG. 1 shows in schematic block form an electric power system 100, a cooling system 200, and their related components of an electric vehicle 10 (hereinafter referred to as "vehicle 10") according to an embodiment of the present invention. FIG. 2 shows in sectional perspective partial structural details and positional relationship of a power control unit 12 (hereinafter referred to as "PCU 12") mounted as an electric motor controller on the electric vehicle 10.

As shown in FIG. 1, the electric power system 100 of the vehicle 10 includes the PCU 12, a traction motor 14 (hereinafter referred to as "motor 14") as an electric motor, a high-voltage battery 16 (hereinafter referred to as "battery 16") as an electric storage device, a 12-volt system 18, a normal charging connection 20, and a quick charging connection 22.

The PCU 12 includes an inverter 30, a motor electronic control unit 32 (hereinafter referred to as "motor ECU 32"), a charger 34 (second converter), a pair of normal charging connectors 36, a step-down DC/DC converter 38 (first converter), a pair of contactors 40, a pair of quick charging connectors 42, a pair of battery connectors 44 (high-voltage terminals), current sensors 46, a through terminal base 48 (see FIG. 2, etc.), and a low-voltage coupler 49. The inverter 30 and the motor ECU 32 jointly make up a power module 50. As shown in FIG. 2, the PCU 12 is encased in a casing 52 which comprises an upper member 54 and a lower member 56.

As shown in FIG. 1, the cooling system 200 of the vehicle 10 has a coolant pump 60, a cooling plate 62 (plate-like member), and a radiator 64 (a peripheral component or a vehicle component). The cooling plate 62 serves as part of the PCU 12 and is disposed in the casing 52 (FIG. 2).

The electric power system 100 and the cooling system 200 are controlled by an integrated electronic control unit 70 (hereinafter referred to as "integrated ECU 70") (see FIG. 1). The integrated ECU 70 controls the vehicle 10 in its entirety.

Incidentally, in FIG. 1, the positional relationship of the components is not shown. The layout of the components of the PCU 12 will be described later with reference to FIGS. 2 through 5.

[1-2. Driving System]

The motor 14 comprises a three-phase AC brushless motor. The motor 14 generates a drive force F [N] or a torque [N·m] for the vehicle 10 based on electric power supplied from the battery 16 through the inverter 30. The motor 14 also generates electric power [W] by operating in a regenerative mode (hereinafter referred to as "regenerated electric power Preg") and supplies the regenerated electric power Preg to the battery 16, thereby charging the battery 16. The regenerated electric power Preg may be supplied to the 12-volt system 18 or unillustrated auxiliaries.

The inverter 30, which is a three-phase bridged inverter, converts direct current into alternating current. The inverter 30 converts direct current into three-phase alternating current and supplies the three-phase alternating current to the motor 14. The inverter 30 also converts alternating current generated by the motor 14 operated in the regenerative mode, into direct current, and supplies the direct current to the battery 16.

The motor 14 and the inverter 30 operate while the vehicle 10 is being driven in both power and regenerative modes (hereinafter, the vehicle 10 will be driven in the power and regenerative modes unless specified otherwise).

The battery 16 comprises an electric storage device (energy storage device) including a plurality of battery cells. The battery 16 may be a lithium ion secondary battery, a nickel hydrogen secondary battery, a capacitor, or the like. In the present embodiment, the battery 16 is a lithium ion secondary battery. The battery 16 is connected to a pair of first electric power lines 80 of the PCU 12 through the battery connectors 44 (see FIG. 1) that provides a connection between the inside and outside of the casing 52 (see FIG. 2).

The motor ECU 32 controls the inverter 30 based on commands from the integrated ECU 70 and output signals from various sensors including the current sensors 46, etc., thereby controlling output power (propulsive power) of the motor 14. In FIG. 1, communication lines between the motor ECU 32 and other parts are omitted from illustration.

[1-3. DC/DC Converter 38 and 12-Volt System 18]

On the basis of a command from the integrated ECU 70, the DC/DC converter 38 steps down a high voltage on the first electric power lines 80 for high-voltage, into a low voltage, and supplies the low voltage to the 12-volt system 18.

The 12-volt system 18 has a 12-V battery 90 and a 12-V load 92 (auxiliary). The components of the 12-volt system 18 can operate while the vehicle 10 is being driven and while the battery 16 is being charged by an external circuit.

[1-4. External Charging System]

As shown in FIG. 1, the charger 34 is connected to a normal charging power supply 110 (external power supply), which is external to the vehicle 10, through the normal charging connection 20 which is connected to the normal charging connectors 36 and a pair of second electric power lines 120 for low-voltage. The charger 34 converts an AC voltage, e.g., 120 V, from the normal charging power supply 110 into a DC voltage, steps up the DC voltage into a high DC voltage, and supplies the high DC voltage to the first electric power lines 80 for high-voltage.

As shown in FIG. 1, the contactors 40 are connected to a quick charging power supply 112, which is external to the vehicle 10, through the quick charging connection 22 which is connected to the quick charging connectors 42 and a pair of third electric power lines 122 for high-voltage. The contactors 40 supply an output voltage, e.g., 240 V, from the quick charging power supply 112 to the first electric power lines 80 for high-voltage.

[1-5. Cooling System 200]

As described above, the cooling system 200 has the coolant pump 60, the cooling plate 62, and the radiator 64. The cooling plate 62 serves as a so-called heat sink. Specifically, the cooling plate 62 includes a first cooling surface (i.e., an upper surface 130 as a first principal surface) and a second cooling surface (i.e., a lower surface 132 as a second principal surface). On each of the cooling surfaces, various circuit components including the charger 34, the DC/DC converter 38, the power module 50, etc. are arranged. Then, coolant (not shown) is passed through the interior of the cooling plate 62 so as to cool the circuit components.

As shown in FIG. 2, the cooling plate 62 has cooling fins 140 and coolant channels 142 therein. The coolant pump 60 delivers the coolant through the coolant channels 142 (see FIG. 2). The cooling plate 62 is made of aluminum, for example, and is more rigid than the peripheral components including the radiator 64, a front assembly 66, etc.

[1-6. Integrated ECU 70]

The integrated ECU 70 manages the vehicle 10 in its entirety. According to the present embodiment, for example, the integrated ECU 70 controls the motor ECU 32, the charger 34, the DC/DC converter 38, the contactors 40, and the coolant pump 60 of the cooling system 200 through the low-voltage coupler 49 and communication lines 144 (signal lines).

2. Layout of Components

[2-1. Layout of PCU 12 on Vehicle 10]

Figure 3:
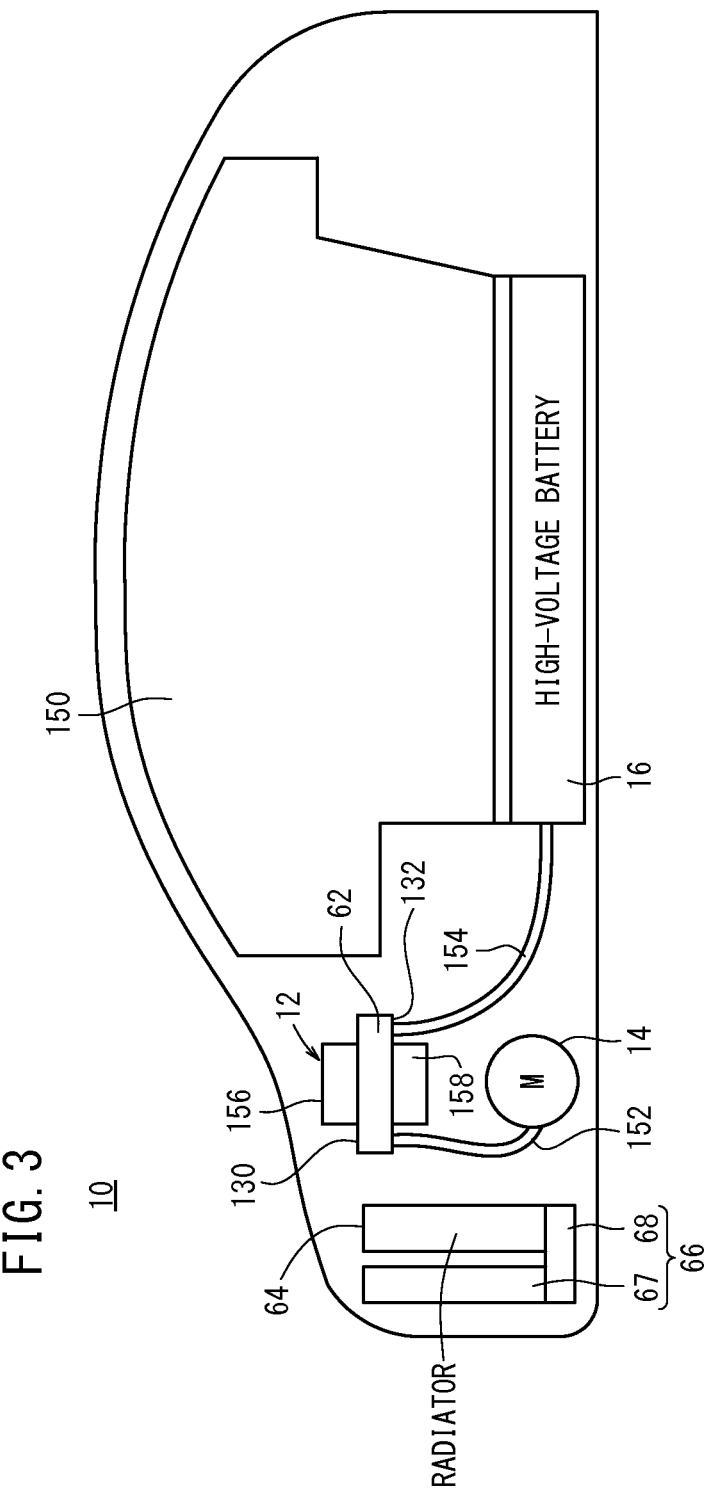
FIG. 3 is a side elevational view schematically showing the layout of the PCU and its related components on the electric vehicle.

FIG. 3 schematically shows in side elevation the layout of the PCU 12 and its related components on the vehicle 10. As shown in FIG. 3, the PCU 12 is disposed forwardly of a passenger compartment 150 of the vehicle 10. The radiator 64 is disposed forwardly of the PCU 12, and the front assembly 66 is disposed forwardly of the radiator 64. The front assembly 66 includes a front bumper member 67 and a radiator supporting frame 68. The motor 14 is disposed below the PCU 12, which is connected to the motor 14 by a first high-voltage DC cable 152 (hereinafter referred to as "first cable 152").

The battery 16 is disposed below the passenger compartment 150, i.e., below front seats and rear seats, not shown. The battery 16 is connected to the PCU 12 through a second high-voltage DC cable 154 (hereinafter referred to as "second cable 154") that includes electric wires. As shown in FIG. 3, the first cable 152 and the second cable 154 are disposed so as to hang loosely.

The cooling plate 62 of the PCU 12 lies along the longitudinal directions of the vehicle 10, i.e., horizontally in FIG. 3. More specifically, the cooling plate 62 is disposed along the longitudinal directions of the vehicle 10, i.e., horizontally, with the upper surface 130 facing upwardly (upwardly in FIG. 3) and the lower surface 132 facing downwardly (downwardly in FIG. 3). An upper circuit component group 156 is disposed on the upper surface 130 of the cooling plate 62, whereas a lower circuit component group 158 is disposed on the lower surface 132 of the cooling plate 62. The upper circuit component group 156 and the lower circuit component group 158 include circuit components (to be described in detail later) of the electric power system 100. In FIG. 3, the casing 52 is omitted from illustration.

According to the present embodiment, the PCU 12 and its related components are arranged as described above to thereby provide various advantages which will be described in detail later.

[2-2. Arrangement and Layout of the Upper Circuit Component Group 156 and the Lower Circuit Component Group 158]

Figure 4:
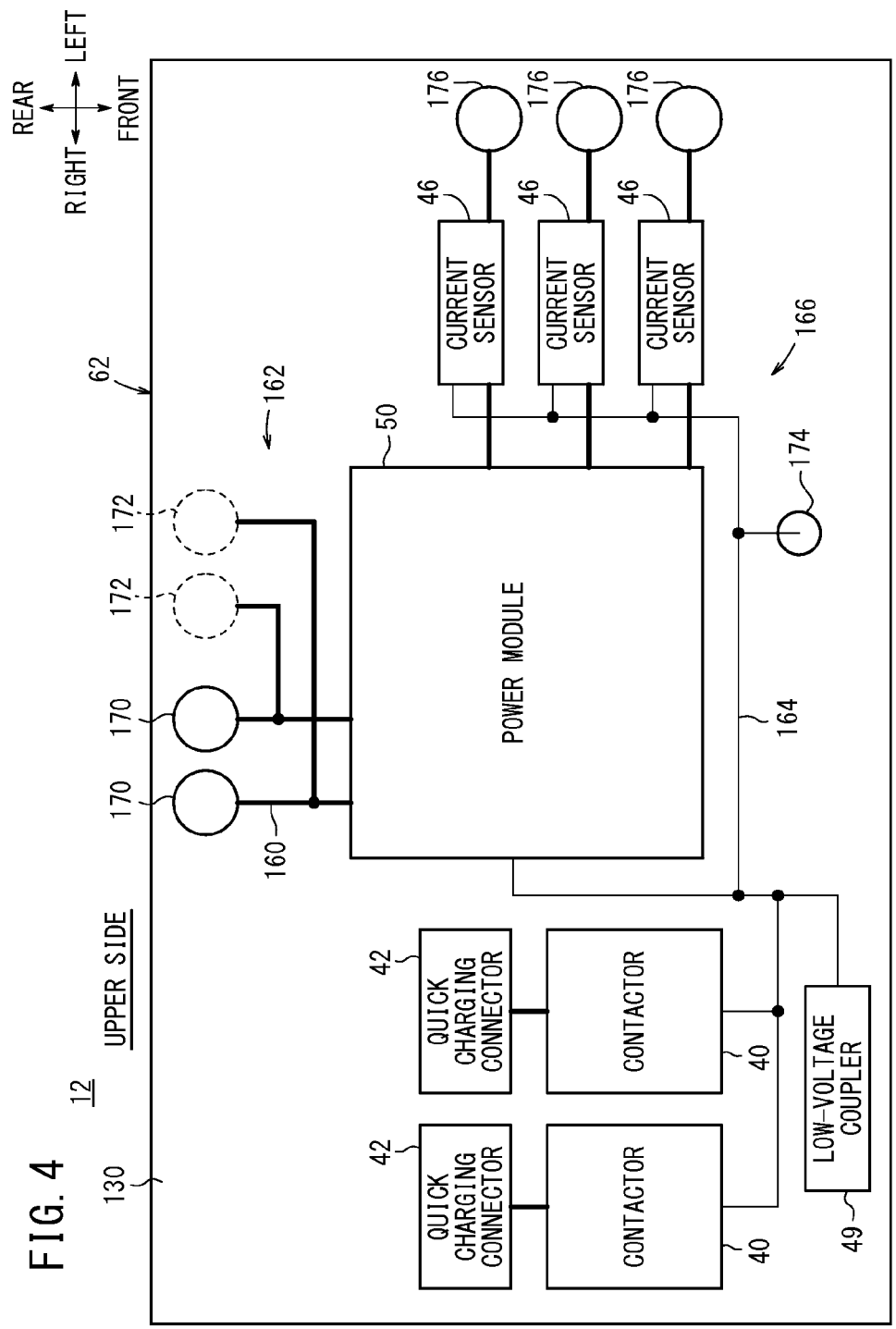
FIG. 4 is a plan view showing specific component layout and wiring details on an upper principal surface (hereinafter referred to as "upper surface") of a cooling portion.
Figure 5:
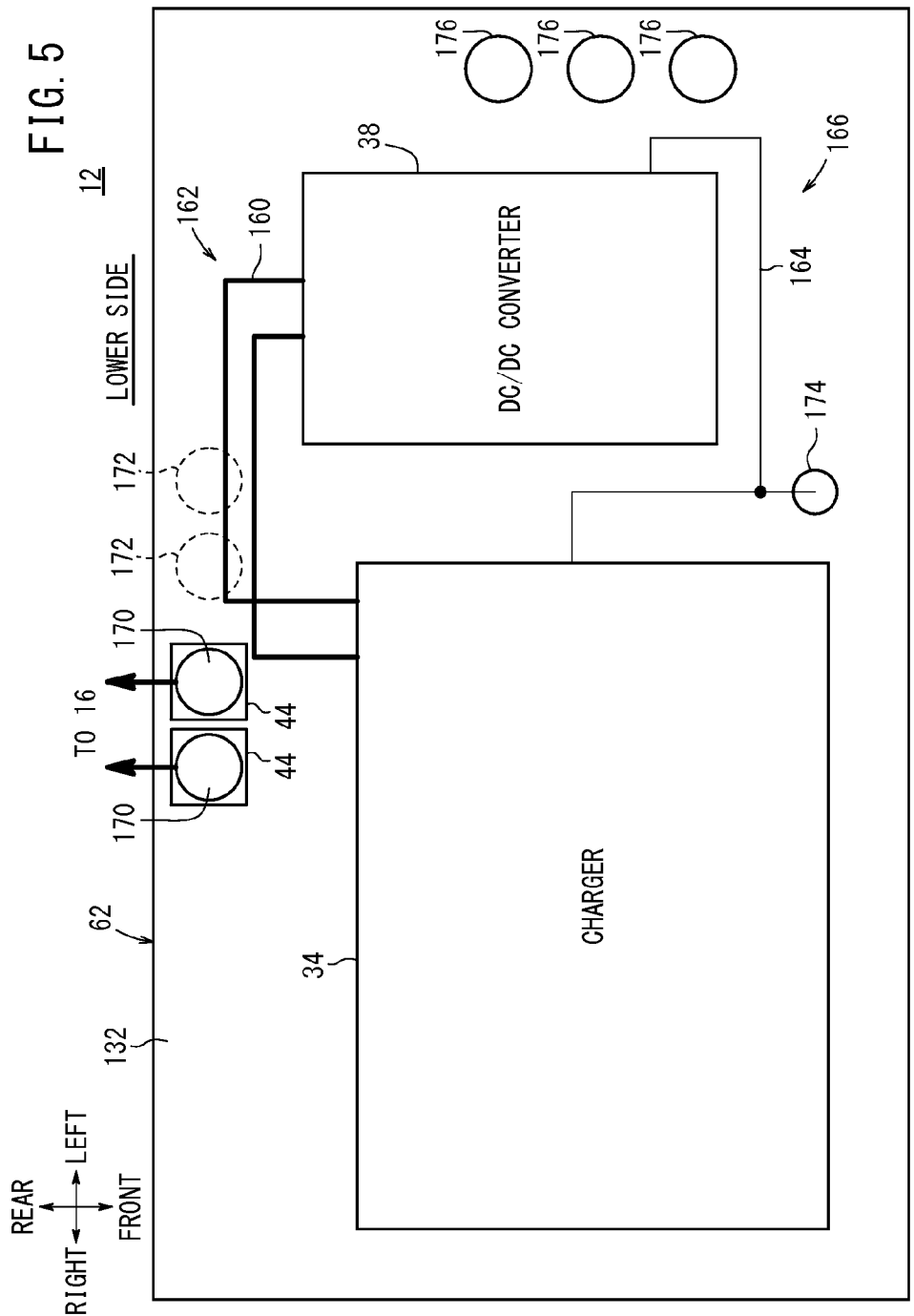
FIG. 5 is a bottom view showing, in a vertically reversed fashion, specific component layout and wiring details on a lower principal surface (hereinafter referred to as "lower surface") of the cooling portion.

FIG. 4 is a plan view showing specific component layout and wiring details on the upper surface 130 of the cooling plate 62. FIG. 5 is a bottom view showing, in a vertically reversed fashion, specific component layout and wiring details on the lower surface 132 of the cooling plate 62. In FIGS. 4 and 5, the terms "FRONT", "REAR", "LEFT", and "RIGHT" refer to directions as viewed from the viewpoint of the driver in the direction of travel of the vehicle 10. FIG. 5 shows the specific component layout and wiring details in the vertically reversed fashion for an easier understanding of the positional relationship of the components. Stated otherwise, FIG. 5 shows the layout as viewed from a plan-view side of the casing 52. It should be noted that when the layout is viewed from the plan-view side of the casing 52, the forward, rearward, leftward, and rightward directions of the components in FIG. 4 and in FIG. 5 coincide respectively with each other.

As shown in FIG. 4, the contactors 40, the quick charging connectors 42, the current sensors 46, the low-voltage coupler 49, and the power module 50 are disposed on the upper surface 130 of the cooling plate 62. As shown in FIG. 5, the charger 34, the DC/DC converter 38, and the battery connectors 44 are disposed on the lower surface 132 of the cooling plate 62.

In FIGS. 4 and 5, thick wires 160 represent high-voltage bus bars and correspond to the first electric power lines 80 in FIG. 1. An area where the high-voltage bus bars 160 are located will hereinafter be referred to as a high-voltage circuit section 162. Thin wires 164 represent a low-voltage harness for supplying low-voltage signals for operating circuit components and correspond to the communication lines 144 in FIG. 1. An area where the low-voltage harness 164 is located will hereinafter be referred to as a low-voltage circuit section 166.

The cooling plate 62 has a plurality of through regions 170, 172, 174, 176 defined therein which interconnect the upper surface 130 and the lower surface 132. The through regions 170, 172, 174, 176 correspond to the through terminal base 48 shown in FIG. 2 and equivalent through terminal bases, not shown.

On both of the upper surface 130 and the lower surface 132, the high-voltage bus bars 160 are positioned more closely to the rear side of the vehicle 10, i.e., to the passenger compartment 150, than the low-voltage harness 164. Therefore, when an impact force is applied from the front end of the vehicle 10, the low-voltage harness 164 side firstly undergoes (absorbs) the impact force. Owing thereto, it becomes easy to protect the high-voltage bus bars 160.

On the lower surface 132, the battery connectors 44 are positioned most closely to the rear side of the vehicle 10, i.e., to the passenger compartment 150. Therefore, when an impact force is applied from the front end of the vehicle 10, the low-voltage harness 164 side firstly undergoes (absorbs) the impact force. Owing thereto, it becomes easy to protect the battery connectors 44.

3. Operation and Advantages of the Present Embodiment Upon Frontal Collision

Figure 6A:
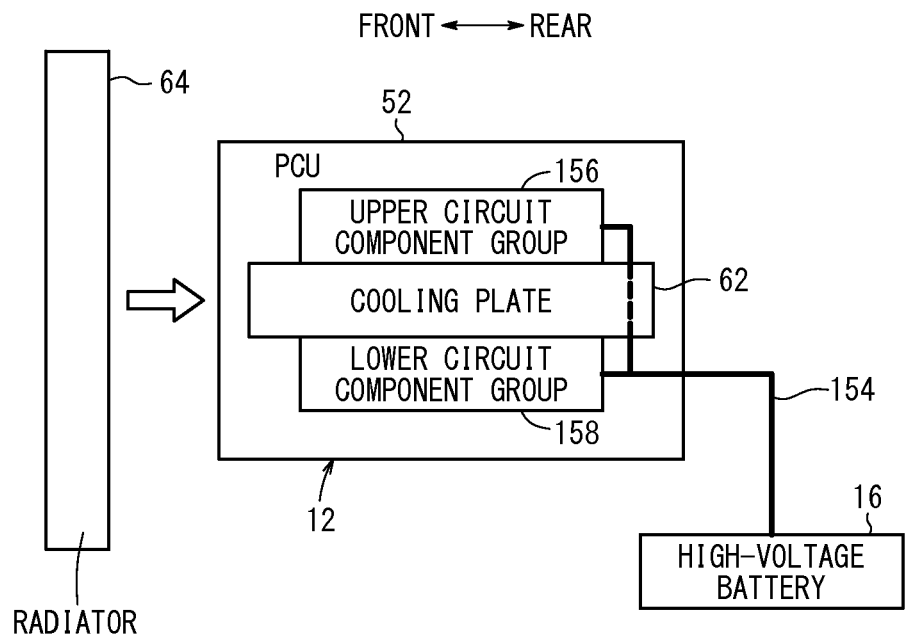
FIG. 6A is a view showing the manner in which a radiator is displaced when the electric vehicle collides on its front end.
Figure 6B:
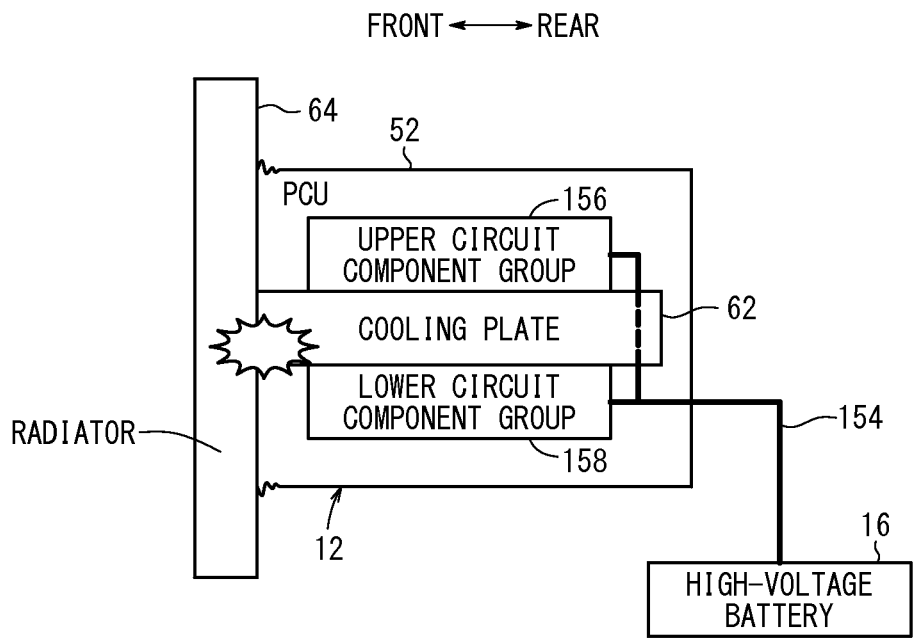
FIG. 6B is a view showing the manner in which the radiator is brought into contact with the PCU when the electric vehicle collides on its front end.

FIGS. 6A and 6B illustrate operation and advantages of the present embodiment upon frontal collision. Specifically, FIG. 6A is a view showing the manner in which the radiator 64 is displaced when the vehicle 10 collides on its front end, and FIG. 6B is a view showing the manner in which the radiator 64 is brought into contact with the PCU 12 when the vehicle 10 collides on its front end.

According to the present embodiment, the cooling plate 62 (plate-like member) is more rigid than the radiator 64 and lies along the longitudinal directions of the vehicle 10. Thus, when the radiator 64 presses the cooling plate 62 under an impact force applied toward the passenger compartment 150 along the longitudinal direction of the vehicle 10, the cooling plate 62 is prevented from being crushed in the longitudinal direction of the vehicle 10. Consequently, the circuit components of the PCU 12, i.e., the upper circuit component group 156 and the lower circuit component group 158, which are disposed on the upper and lower surfaces 130, 132 of the cooling plate 62 are prevented from being damaged.

According to the present embodiment, furthermore, the circuit components of the PCU 12, i.e., the upper circuit component group 156 and the lower circuit component group 158, are disposed on the upper and lower surfaces 130, 132 of the cooling plate 62. Therefore, when the cooling plate 62 is pressed by the radiator 64 upon collision of the vehicle 10 and is displaced so as to slide in the longitudinal direction of the vehicle 10, the PCU 12 can be prevented from being pressed between the cooling plate 62 and the radiator 64.

According to the present embodiment, moreover, since the circuit components of the PCU 12, i.e., the upper circuit component group 156 and the lower circuit component group 158, are disposed on both the upper and lower surfaces 130, 132 of the cooling plate 62, the cooling plate 62 can be prevented from getting larger in size, compared to a case where the circuit components of the PCU 12 are disposed on one of the upper and lower surfaces 130, 132.

According to the present embodiment, in addition, the battery 16 is disposed more closely to the passenger compartment 150 than the cooling plate 62 along the longitudinal direction of the vehicle 10, and is connected to the PCU 12 by the second cable 154 (see FIG. 3). Consequently, when the radiator 64 presses the cooling plate 62 toward the passenger compartment 150 upon frontal collision of the vehicle 10, the second cable 154 is displaced toward the battery 16, or stated otherwise, in a direction in which the second cable 154 shrinks. Therefore, the second cable 154, which interconnects the battery 16 and the PCU 12, can be prevented from being stretched and damaged.

According to the present embodiment, the high-voltage circuit section 162 is positioned more closely to the passenger compartment 150 than the low-voltage circuit section 166 along the longitudinal direction of the vehicle 10 (see FIGS. 4 and 5). Consequently, when the radiator 64 presses the cooling plate 62 toward the passenger compartment 150 upon frontal collision of the vehicle 10, the low-voltage circuit section 166 undergoes (absorbs) the impact earlier than the high-voltage circuit section 162. Therefore, the high-voltage circuit section 162 can be further effectively prevented from being damaged.

Inasmuch as the high-voltage circuit section 162 is positioned more closely to the passenger compartment 150 than the low-voltage circuit section 166 in the longitudinal direction of the vehicle 10, the high-voltage circuit section 162 and the low-voltage circuit section 166 can be positioned in different areas separated in the longitudinal direction of the vehicle 10 on the upper or lower surface 130, 132 of the cooling plate 62. Therefore, even if the high-voltage circuit section 162 and the low-voltage circuit section 166 are disposed on one principal surface (the upper surface 130 or the lower surface 132) of the cooling plate 62, the high-voltage circuit section 162 can be prevented from being positioned relatively closely to the low-voltage circuit section 166. As a result, any noise that the low-voltage circuit section 166 receives from the high-voltage circuit section 162 is reduced, and hence the low-voltage circuit section 166 can be prevented from malfunctioning in the PCU 12.

According to the present embodiment, the high-voltage circuit section 162 has the battery connectors 44 (high-voltage terminals) disposed on the lower surface 132 of the cooling plate 62 most closely to the passenger compartment 150, and the second cable 154 is connected to the battery 16 and the battery connectors 44. Consequently, when the radiator 64 presses the cooling plate 62 toward the passenger compartment 150 upon frontal collision of the vehicle 10, the other components than the battery connectors 44 and the second cable 154 undergo (absorb) the impact earlier than the battery connectors 44 and the second cable 154. Therefore, the battery connectors 44 and the second cable 154 can be further effectively prevented from being damaged. In addition, as the length of the second cable 154, which interconnects the PCU 12 and the battery 16, can be relatively shortened, power loss caused by the second cable 154 can be reduced.

According to the present embodiment, the high-voltage circuit section 162 has the inverter 30, the charger 34, and the DC/DC converter 38, with the inverter 30 (power module 50) being disposed on the upper surface 130 of the cooling plate 62 (see FIG. 4) and the charger 34 and the DC/DC converter 38 being disposed on the lower surface 132 of the cooling plate 62 (see FIG. 5). Therefore, the inverter 30, and the charger 34 and the DC/DC converter 38, each in the form of a high-voltage circuit, can be positioned on mutually different surfaces of the cooling plate 62. The cooling plate 62 can be thus prevented from increasing in size, while it cools the inverter 30, the charger 34, and the DC/DC converter 38, which each are a heat generator.

B. Modifications

The present invention is not limited to the above embodiment, but may employ various arrangements based on the disclosure of the present description. For example, the present invention may employ the following arrangements:

1. Objects in which the Invention may be Incorporated

In the above embodiment, the PCU 12 is incorporated in the electric vehicle 10. However, the PCU 12 may be incorporated in other objects. For example, the PCU 12 may be incorporated in a movable body such as a ship or an aircraft, for example.

In the above embodiment, only the motor 14 is used as the drive source of the vehicle 10. However, the present invention is not limited to the above case. For example, the present invention is also applicable to another vehicle such as a vehicle (hybrid vehicle) having an engine in addition to the motor 14 or a vehicle (fuel cell vehicle) having a fuel cell in addition to the motor 14.

2. PCU 12 and Motor 14

[2-1. Arrangement of PCU 12 and Motor 14]

Figure 7:
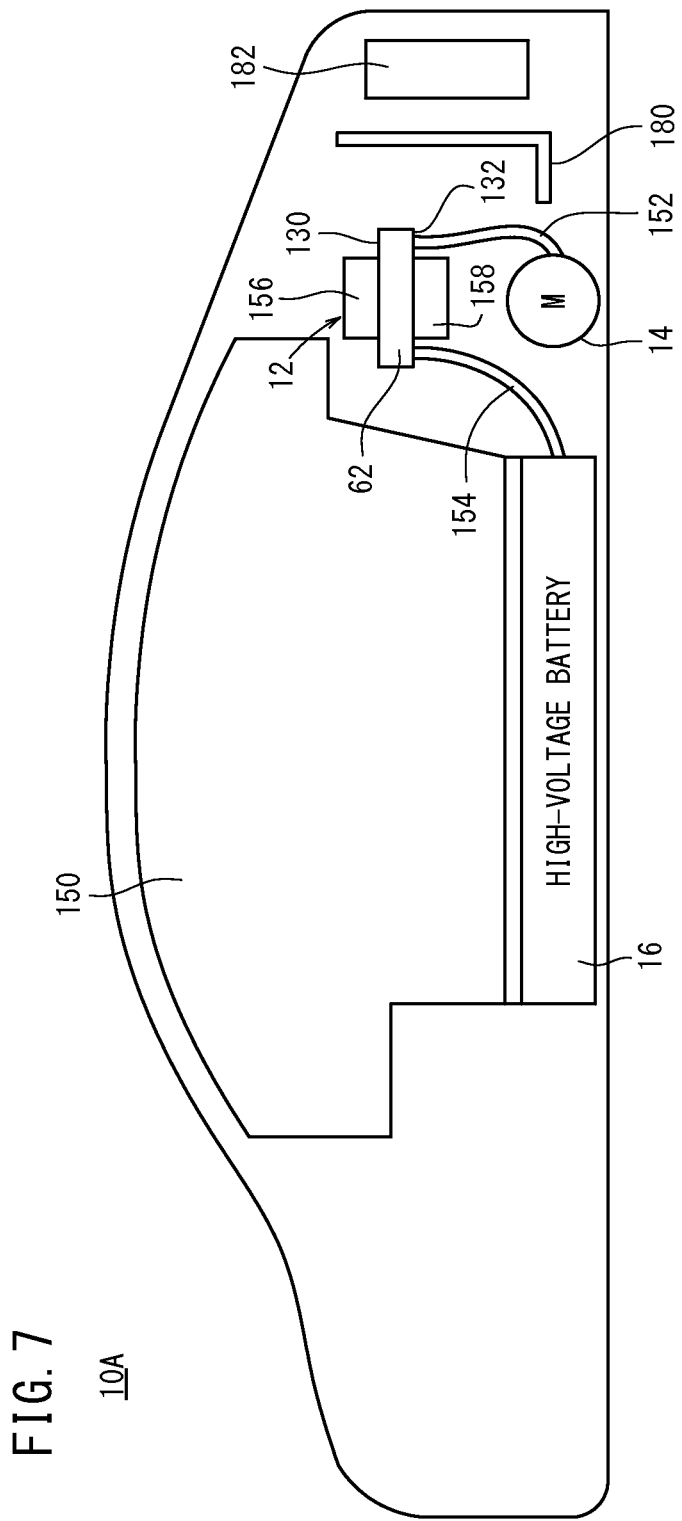
FIG. 7 is a side elevational view schematically showing the layout of the PCU and its related components on an electric vehicle according to a modification.

In the above embodiment, the PCU 12 is disposed forwardly of the passenger compartment 150. However, the present invention is not limited to such an arrangement. FIG. 7 schematically shows in side elevation the layout of the PCU 12 and its related components on an electric vehicle 10A (hereinafter also referred to as "vehicle 10A") according to a modification. On the vehicle 10A shown in FIG. 7, the PCU 12, the motor 14, the first cable 152, and the second cable 154 are disposed rearwardly of the passenger compartment 150. Further, a rear panel 180 and a rear bumper member 182 are disposed rearwardly of the PCU 12, the motor 14, the first cable 152, and the second cable 154. The layout according to the modification offers the same advantages as the above embodiment when an impact force is applied to the vehicle 10A from the rear end of the vehicle 10A. In this case, the cooling plate 62 is made more rigid than peripheral components, e.g., the rear panel 180 and the rear bumper member 182, which may possibly be brought into contact with the cooling plate 62 upon rear collision.

[2-2. Layout and Arrangement in PCU 12]

In the above embodiment, the circuit components (constituent elements) such as the power module 50, etc. are disposed on the upper surface 130 of the cooling plate 62, whereas the circuit components such as the charger 34, the DC/DC converter 38, etc. are disposed on the lower surface 132 of the cooling plate 62. However, the circuit components on the upper and lower surfaces 130, 132 may be disposed as desired.

In the above embodiment, the circuit components, i.e., the upper circuit component group 156 and the lower circuit component group 158, are disposed respectively on the upper and lower surfaces 130, 132 of the cooling plate 62. However, the circuit components may be disposed on only either one of the upper and lower surfaces 130, 132. In this case, the cooling plate 62 may have only one of the upper and lower surfaces 130, 132 as a cooling surface.

In the above embodiment, the cooling plate 62 is disposed between the upper circuit component group 156 and the lower circuit component group 158. However, the plate-like member disposed between the upper circuit component group 156 and the lower circuit component group 158 may not be a cooling member. Instead of the cooling plate 62, an insulating member may be disposed between the upper circuit component group 156 and the lower circuit component group 158. In this case, the cooling plate 62 may be disposed at least over the upper circuit component group 156 or beneath the lower circuit component group 158.

In the above embodiment, the cooling plate 62 lies horizontally along the longitudinal directions of the vehicle 10. However, the cooling plate 62 may be disposed otherwise insofar as it lies along the longitudinal directions of the vehicle 10. For example, the cooling plate 62 may lie vertically along the longitudinal directions of the vehicle 10. In this case, the circuit components can be disposed on the left and right sides of the cooling plate 62 with respect to the vehicle 10.

[2-3. Arrangement of Motor 14]

In the above embodiment, the motor 14 comprises a three-phase AC brushless motor. However, the motor 14 may be another motor insofar as it can propel the vehicle 10. For example, the motor 14 may comprise a three-phase AC brush motor, a single-phase AC motor, or a DC motor.

3. Others

In the above embodiment, the radiator 64 is illustrated as a peripheral component or vehicle component which tends to contact the PCU 12 upon frontal collision. However, the peripheral component or vehicle component which may possibly contact the PCU 12 upon frontal collision is not limited to the radiator 64, but may be the front assembly 66 including the front bumper member 67 and the radiator supporting frame 68, for example. The peripheral component or vehicle component which may possibly contact the PCU 12, referred to above, is a peripheral component or vehicle component which may possibly contact the PCU 12 upon frontal collision in a case where the PCU 12 is disposed forwardly of the passenger compartment 150. If such a peripheral component or vehicle component may possibly contact the PCU 12, the cooling plate 62 can be made more rigid than the peripheral component or vehicle component.

If the PCU 12 is disposed forwardly of the passenger compartment 150, then the cooling plate 62 only has to be made more rigid than the peripheral component or vehicle component that may possibly contact the PCU 12 upon frontal collision, but is not necessarily required to be made more rigid than peripheral components, e.g., the motor 14, that are present on the upper side or the lower side of the cooling plate 62 (upper and lower directions in FIG. 3).

The invention claimed is:

1. An electric vehicle comprising:
an electric motor configured to propel the vehicle;
an electric storage device configured to supply electric power to the electric motor;
an electric motor controller configured to control the electric motor by use of the electric power supplied from the electric storage device to the electric motor; and
a peripheral component or a vehicle component of the vehicle which is disposed around the electric motor controller; and
a plate-shape member disposed along a longitudinal direction of the vehicle, the plate-shape member being more rigid than the peripheral component or the vehicle component, the plate-shape member having a first principal surface and a second principal surface opposite to the first principal surface,
wherein the electric motor controller is disposed on at least one of the first principal surface and the second principal surface;
the electric storage device is disposed more closely to a passenger compartment of the vehicle than the plate-shape member in the longitudinal direction of the vehicle, and connected to the electric motor controller by electric wires;
the electric motor controller includes a low-voltage circuit section to which a relatively low prescribed voltage is applied and a high-voltage circuit section to which a voltage higher than the voltage applied to the low-voltage circuit section is applied; and
the high-voltage circuit section is disposed more closely to the passenger compartment than the low-voltage circuit section in the longitudinal direction of the vehicle,
wherein the plate-shape member extends along the longitudinal direction of the vehicle and the first principal surface extends along the longitudinal direction of the vehicle.

2. The electric vehicle according to claim 1, wherein the high-voltage circuit section has high-voltage terminals disposed on the first principal surface or the second principal surface of the plate-shape member most closely to the passenger compartment; and
the electric wires are connected to the electric storage device and the high-voltage terminals of the high-voltage circuit section.

3. The electric vehicle according to claim 1, wherein the high-voltage circuit section includes an inverter configured to convert a DC voltage from the electric storage device into an AC voltage and at least one of a first converter configured to step up or down the DC voltage from the electric storage device and a second converter configured to convert an AC voltage from an external power supply into a DC voltage;
the inverter is disposed on one of the first principal surface and the second principal surface of the plate-shape member, and the at least one of the first converter and the second converter is disposed on another one of the first principal surface and the second principal surface.

4. The electric vehicle according to claim 3, wherein the electric wires are connected to the electric storage device and high-voltage terminals of the high-voltage circuit section;
the high-voltage circuit section includes high-voltage bus bars interconnecting the high-voltage terminals, and the inverter, the first converter, or the second converter.

5. The electric vehicle according to claim 3, wherein the low-voltage circuit section has a communication line configured to supply a signal for operating the inverter, the first converter, or the second converter.

6. The electric vehicle according to claim 3, wherein the high-voltage circuit section includes a current sensor connected to a supply line configured to supply the AC voltage from the inverter to the electric motor; and
the low-voltage circuit section includes a communication line configured to control the current sensor.

7. The electric vehicle according to claim 1, wherein the high-voltage circuit section includes contactors connected between charging connectors and the electric storage device; and the low-voltage circuit section includes communication lines configured to control the contactors.

8. The electric vehicle according to claim 1, wherein the plate-shape member comprises a cooling plate having coolant channels configured to pass a coolant therethrough.

9. The electric vehicle according to claim 8, wherein the electric vehicle further includes, as the peripheral component, a radiator for the coolant or a radiator supporting frame supporting the radiator.

10. The electric vehicle according to claim 1, wherein the electric vehicle further includes a front bumper member or a rear bumper member as the vehicle component.

11. The electric vehicle according to claim 1, wherein the electric storage device is disposed separately from the plate-shape member.

12. The electric vehicle according to claim 1, wherein the plate-shape member vertically extends and the first principal surface vertically extends.

13. The electric vehicle according to claim 1, wherein the plate-shape member horizontally extends and the first principal surface horizontally extends.

* * * * *